United States Patent
Moon (10) Patent No.: US 7,253,858 B2
(45) Date of Patent: Aug. 7, 2007

(54) LIQUID CRYSTAL DISPLAY DEVICE USING CHOLESTERIC LIQUID CRYSTAL

(75) Inventor: Jong-Weon Moon, Annyang-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/614,293

(22) Filed: Jul. 8, 2003

(65) Prior Publication Data

US 2004/0008302 A1    Jan. 15, 2004

(30) Foreign Application Priority Data

Jul. 9, 2002   (KR) ..................... 10-2002-0039609

(51) Int. Cl.
*G02F 1/1335*   (2006.01)
(52) U.S. Cl. ..................... 349/115; 349/96; 349/97; 349/114
(58) Field of Classification Search ................. 349/115
See application file for complete search history.

(56) References Cited

U.S. PATENT DOCUMENTS

| | | | |
|---|---|---|---|
| 6,574,044 B1* | 6/2003 | Sahouani et al. | 359/498 |
| 6,597,418 B2* | 7/2003 | Moon et al. | 349/98 |
| 2001/0026335 A1* | 10/2001 | Moon | 349/63 |
| 2002/0012085 A1* | 1/2002 | Honda et al. | 349/112 |
| 2002/0036735 A1* | 3/2002 | Arakawa et al. | 349/115 |
| 2004/0008301 A1* | 1/2004 | Yoon | 349/115 |

FOREIGN PATENT DOCUMENTS

KR        2001111863 A    * 12/2001

* cited by examiner

*Primary Examiner*—David Nelms
*Assistant Examiner*—Michael H. Caley
(74) *Attorney, Agent, or Firm*—McKenna Long & Aldridge LLP (57) ABSTRACT

A liquid crystal display device includes: first and second substrates facing and spaced apart from each other; a retardation layer on an outer surface of the first substrate; a linear polarizing layer on the retardation layer; a cholesteric liquid crystal color filter (CCF) layer on an inner surface of the second substrate; a liquid crystal layer between the first substrate and the CCF layer; a first cholesteric liquid crystal (CLC) polarizing layer on an outer surface of the second substrate, the first CLC polarizing layer having a first helical pitch of a first circular polarization direction; a second cholesteric liquid crystal (CLC) polarizing layer on the first CLC layer, the second CLC polarizing layer having a second helical pitch of a second circular polarization direction opposite to the first circular polarization direction; and a backlight unit outside the second CLC layer.

11 Claims, 7 Drawing Sheets

LIQUID CRYSTAL DISPLAY DEVICE USING CHOLESTERIC LIQUID CRYSTAL

This application claims the benefit of Korean Patent Application No. 2002-39609, filed on Jul. 9, 2002, which is hereby incorporated by reference for all purposes as if fully set forth herein.

BACKGROUND OF THE INVENTION

1. Field of the Invention

The present invention relates to liquid crystal display devices, and more particularly to transmissive liquid crystal display devices using a cholesteric liquid crystal polarizing plate and a cholesteric liquid crystal color filter layer.

2. Discussion of the Related Art

In general, a liquid crystal display (LCD) device makes use of optical anisotropy and polarization properties of liquid crystal molecules. The liquid crystal molecules have a definite orientational alignment that results from their thin and long shape. The alignment direction of the liquid crystal molecules can be controlled by application of an electric field to the liquid crystal molecules. Accordingly, as an intensity of the applied electric field changes, the alignment orientation of the liquid crystal molecules also changes. Since incident light through a liquid crystal material is refracted due to an orientation of the liquid crystal molecules resulting from the optical anisotropy of the aligned liquid crystal molecules, an intensity of the incident light can be controlled and images can be displayed.

Among the various types of LCD devices commonly used, active matrix LCD (AM-LCD) devices, in which thin film transistors (TFTs) and pixel electrodes connected to the TFTs are disposed in matrix, have been developed because of their high resolution and superior display of moving images.

Figure 1:
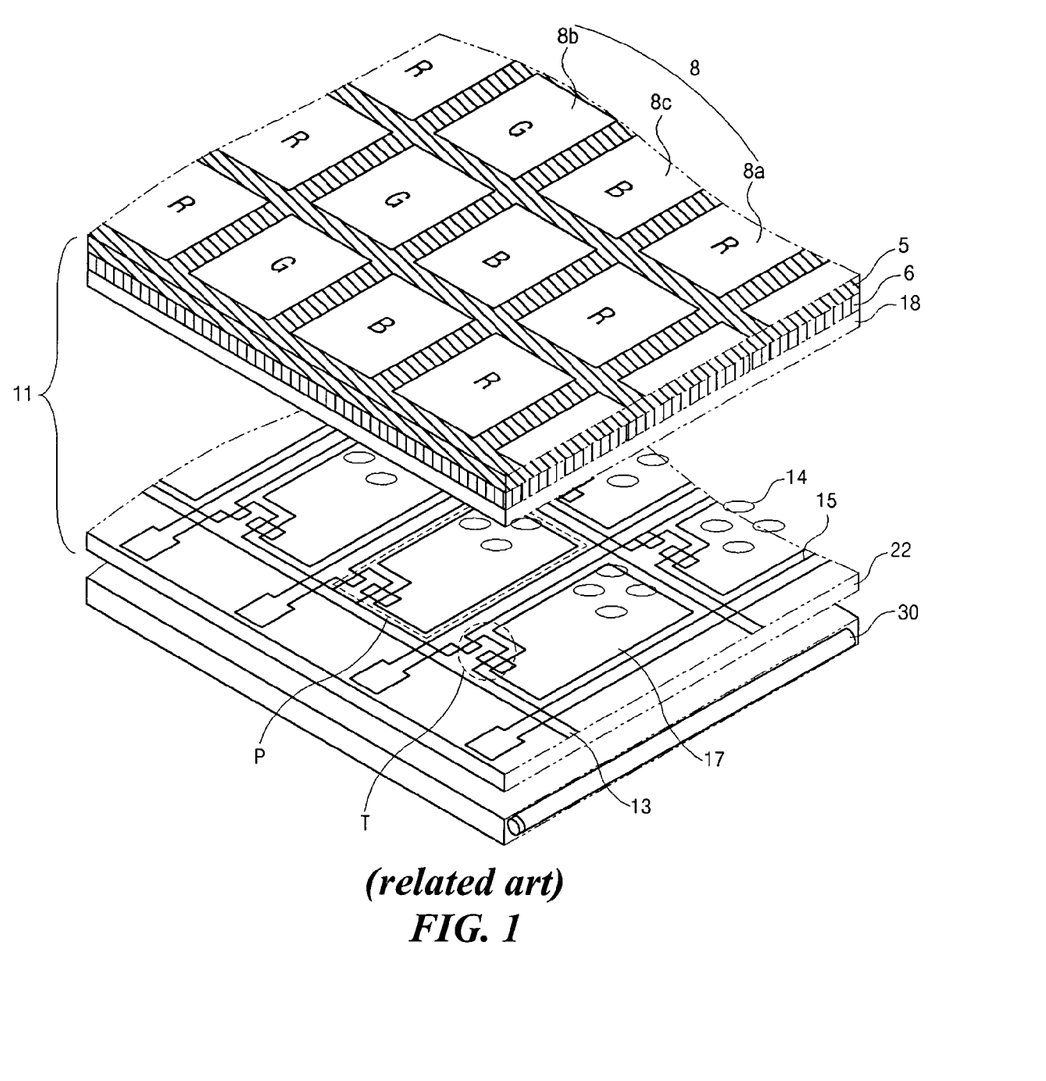
FIG. 1 is a schematic perspective view of a liquid crystal display device according to the related art.

FIG. 1 is a schematic perspective view of a liquid crystal display device according to the related art.

In FIG. 1, the liquid crystal display (LCD) device 11 includes upper and lower substrates 5 and 22, and a liquid crystal layer 14 interposed therebetween. A black matrix 6 and a color filter layer 8 including red, green and blue sub color filters 8a, 8b and 8c are formed on the upper substrate 5. A transparent common electrode 18 is formed on the color filter layer 8 and the black matrix 6. The upper substrate 5 is referred to as a color filter substrate. A pixel electrode 17 of a pixel region "P," a switching element "T" and array lines including a gate line 13 and a data line 15 are formed on the lower substrate 22. The lower substrate 22 is referred to as an array substrate. The switching element "T" is disposed in matrix and connected to the gate line 13 and the data line 15. The pixel region "P" is defined by crossing of the gate lines 13 and the data lines 15. The pixel electrode 17 at the pixel region "P" is made of transparent conductive material such as indium-tin-oxide (ITO) or indium-zinc-oxide (IZO) having high transmittance. A backlight unit 30 is disposed under the LCD device 11 as a light source.

When a gate signal is applied to the switching element "T," a data signal is applied to the pixel electrode 17. When a gate signal is not applied to the switching element "T," a data signal cannot be applied to the pixel electrode 17. That is, the LCD device 11 is a kind of light modulating device using light emitted from the backlight unit 30. Since the light from the backlight unit 30 passes through a plurality of optical films to display images, the LCD device 11 has a poor light efficiency. The plurality of optical films include a pair of linear polarizing plates (not shown) and a color filter layer 8. The pair of linear polarizing plates transmits only linear components of the light from the backlight unit 30. That is, the pair of polarizing plates transmits only linearly polarized light along a specific direction. Accordingly, only a portion less than about half of the light emitted from the backlight unit 30 passes through the pair of linear polarizing plates. The backlight unit 30 is not efficiently used, thereby a brightness of the LCD device reduced. Moreover, the color filter layer 8 of an absorption type causes heavy losses of the light from the backlight unit 30 and reduction of brightness. To solve the problem of brightness reduction, the color filter layer 30 should be formed to have high transmittance. However, high transmittance of the color filter layer 30 is obtained with reduction of color purity. Accordingly, there is a limitation to increase transmittance of the absorption type color filter layer 30.

To solve the brightness problem of LCD devices using an absorption type color filter layer, LCD devices using a cholesteric liquid crystal color filter (CCF) layer have been researched and developed. The CCF layer uses a selective reflection property of cholesteric liquid crystal (CLC). Since a wavelength band of transmitted or reflected light is determined according to a helical pitch of the CLC, a CCF layer can be obtained by forming a CLC to have a different helical pitch according to a pixel region. Contrary to an absorption type color filter layer, the CCF layer uses a selective reflection property. Accordingly, a light efficiency is improved by reducing losses of the light from the backlight unit.

Figure 2:
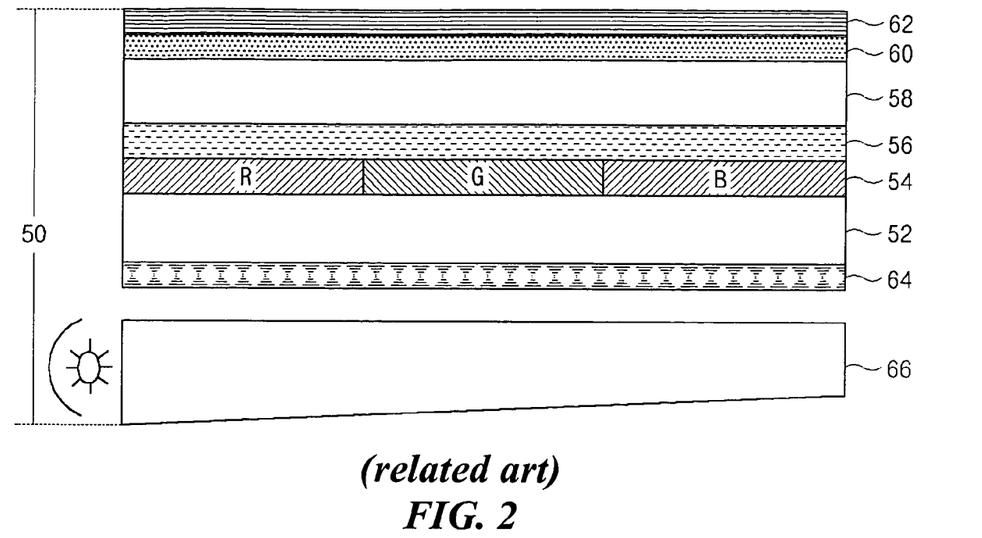
FIG. 2 is a schematic cross-sectional view of a transmissive liquid crystal display device using a cholesteric liquid crystal color filter layer according to the related art.

FIG. 2 is a schematic cross-sectional view of a transmissive liquid crystal display device using a cholesteric liquid crystal color filter layer according to the related art.

In FIG. 2, a transmissive liquid crystal display (LCD) device 50 includes first and second substrates 52 and 58 facing into and spaced apart from each other. A cholesteric liquid crystal color filter (CCF) layer 54 is formed on an inner surface of the first substrate 52 and a cholesteric liquid crystal (CLC) polarizing layer 64 is formed on an outer surface of the first substrate 52. A retardation layer 60 such as a quarter weave plate (QWP: λ/4 plate) and a linear polarizing layer 62 are sequentially formed on an outer surface of the second substrate 58. A liquid crystal layer 56 is formed between the CCF layer 54 and an inner surface of the second substrate 58. A backlight unit 66 is formed outside the CLC polarizing layer 64.

In cholesteric liquid crystal (CLC) used for the CCF layer 54 and the CLC polarizing layer 64, alignment vectors of CLC molecules form a helical structure. The CLC molecules twisted with a right-handed helical direction reflect only right-handed circularly polarized light, while the CLC molecules twisted with a left-handed helical direction reflect only left-handed circularly polarized light. When incident light has a polarization state such that the circular polarization direction is the same as the helical direction and satisfies a Bragg's reflection condition, the incident light is reflected. For example, the CCF layer 54 has a left-handed helical direction and the CLC polarizing layer 64 has a right-handed helical direction. Accordingly, only left-handed circularly polarized light of incident light passes through the CLC polarizing layer 64. The left-handed circularly polarized light also passes through the CCF layer 54 and reaches the liquid crystal layer 56. The CCF layer 54 is formed to display one of red (R), green (G) and blue (B) colors in each pixel region. For example, in a pixel region for red color, the CCF layer 54 is formed to have helical pitches corresponding to green and blue colors. Thus, left-handed circularly polarized light corresponding to green and blue colors is reflected at the CCF layer 54 and only left-handed circularly polarized light corresponding to red color passes through the CCF layer 54. Similar formation of the CCF layer 54 can be applied to pixel regions for green and blue colors.

Figure 3:
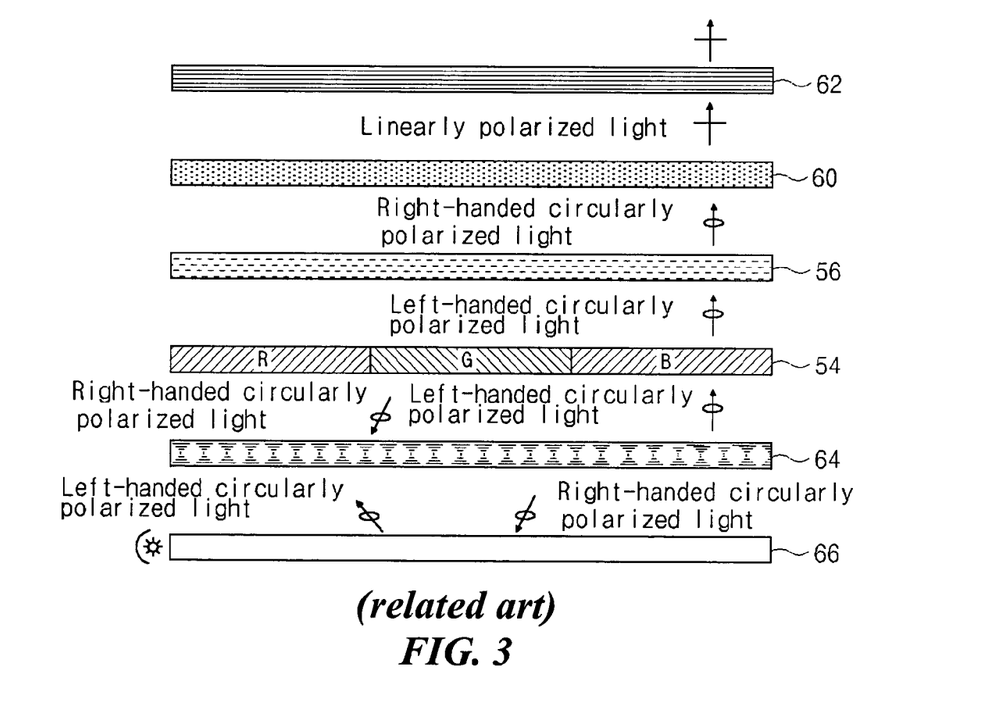
FIG. 3 is a schematic cross-sectional view illustrating polarization state of light passing through a transmissive liquid crystal display device according to the related art.

FIG. 3 is a schematic cross-sectional view illustrating polarization state of light passing through a transmissive liquid crystal display device according to the related art.

In FIG. 3, non-polarized light emitted from a backlight unit 66 includes nearly all wavelengths to have a broadband of wavelength. Among the non-polarized light, right-handed circularly polarized light reflects from a CLC polarizing layer 64 to the backlight unit 66 and only left-handed circularly polarized light passes through the CLC polarizing layer 64 according to characteristics of the CLC polarizing layer 64. When the right-handed circularly polarized light reflecting from the CLC polarizing layer 64 again reflects from the backlight unit 66, the circular polarization direction is inverted such that the right-handed circularly polarized light becomes left-handed circularly polarized light. Accordingly, the left-handed circularly polarized light reflecting from the backlight unit 66 can pass through the CLC polarizing layer 64. Therefore, most circularly polarized light finally has left-handedness during a recycling process of light and passes through the CLC polarizing layer 64.

When the left-handed circularly polarized light having a broadband of wavelength meets a CCF layer 54 of one pixel region, left-handed circularly polarized light having a wavelength corresponding to one of red, green and blue colors passes through the CCF layer 54. For example, in a pixel region for red color, the CCF layer 54 is formed to have a first CLC layer (not shown) reflecting only left-handed circularly polarized light having a wavelength corresponding to green color and a second CLC layer (not shown) reflecting only left-handed circularly polarized light having a wavelength corresponding to blue color. Accordingly, left-handed circularly polarized light having a wavelength corresponding to red color can pass through the CCF layer 54 in a pixel region for red color. When the left-handed circularly polarized light reflecting from the CCF layer 54 again reflects from the CLC polarizing layer 64, the circular polarization direction is inverted such that the left-handed circularly polarized light becomes right-handed circularly polarized light. Accordingly, the right-handed circularly polarized light reflecting from the CLC polarizing layer 64 can pass through the CCF layer 54. By repetition of the aforementioned process, most light having a wavelength corresponding to a specific color can pass the CCF layer 54 without loss.

While the circularly polarized light that has passed through the CCF layer 54 passes a liquid crystal layer 56 and a retardation layer 60, the circularly polarized light is retarded to be a linearly polarized light having a polarization direction parallel to an optical axis of a linear polarizing layer 62 and then emitted to the outside.

Since the CLC molecules have a property of recycling light, the CLC polarizing layer and the CCF layer have higher transmittance than a conventional linear polarizing layer and an absorption type color filter layer. Accordingly, high brightness can be obtained. However, reflected light for an obliquely incident light has a shorter wavelength than that for a perpendicularly incident light. As a result, light obliquely emitted from an LCD panel has different color (i.e. wavelength) from light perpendicularly emitted from the LCD panel. This difference causes a color inversion and a narrow viewing angle.

SUMMARY OF THE INVENTION

Accordingly, the present invention is directed to a transmissive liquid crystal display device that substantially obviates one or more of the problems due to limitations and disadvantages of the related art.

An advantage of the present invention is to provide a transmissive liquid crystal display device including a cholesteric liquid crystal color filter layer and first and second cholesteric liquid crystal polarizing films.

An advantage of the present invention is to provide a transmissive liquid crystal display device having a wide viewing angle and a high brightness.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: first and second substrates facing and spaced apart from each other; a retardation layer on an outer surface of the first substrate; a linear polarizing layer on the retardation layer; a cholesteric liquid crystal color filter (CCF) layer on an inner surface of the second substrate; a liquid crystal layer between the first substrate and the CCF layer; a first cholesteric liquid crystal (CLC) polarizing layer on an outer surface of the second substrate, the first CLC polarizing layer having a first helical pitch of a first circular polarization direction; a second cholesteric liquid crystal (CLC) polarizing layer on the first CLC polarizing layer, the second CLC polarizing layer having a second helical pitch of a second circular polarization direction opposite to the first circular polarization direction; and a backlight unit outside the second CLC polarizing layer.

In another aspect of the present invention, a liquid crystal display device includes: first and second substrates facing and spaced apart from each other; a diffusing layer on an outer surface of the first substrate; a first linear polarizing layer on the diffusing layer; a cholesteric liquid crystal color filter (CCF) layer on an inner surface of the second substrate; a retardation layer on the CCF layer; a second linear polarizing layer on the retardation layer; a liquid crystal layer between the first substrate and the second linear polarizing layer; a first cholesteric liquid crystal (CLC) polarizing layer on an outer surface of the second substrate, the first CLC polarizing layer having a first helical pitch of a first circular polarization direction; a second cholesteric liquid crystal (CLC) polarizing layer on the first CLC polarizing layer, the second CLC polarizing layer having a second helical pitch of a second circular polarization direction opposite to the first circular polarization direction; and a backlight unit outside the second CLC polarizing layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings. Wherever possible, similar reference numbers will be used throughout the drawings to refer to the same or like parts.

Figure 4:
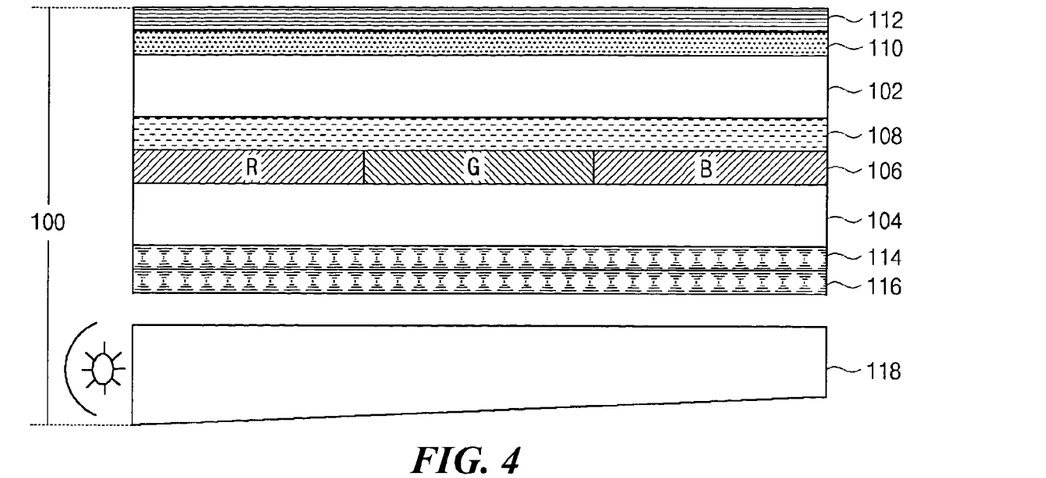
FIG. 4 is a schematic cross-sectional view of a transmissive liquid crystal display device according to a first embodiment of the present invention.

FIG. 4 is a schematic cross-sectional view of a transmissive liquid crystal display device according to a first embodiment of the present invention.

In FIG. 4, a transmissive liquid crystal display (LCD) device 100 includes first and second substrates 102 and 104 facing and spaced apart from each other, and a liquid crystal layer 108 interposed therebetween. A retardation layer 110 such as quarter wave plate (QWP) and a linear polarizing layer 112 are sequentially formed on an outer surface of the first substrate 102. A cholesteric liquid crystal color filter (CCF) layer 106 including red, green and blue sub CCFs is formed on an inner surface of the second substrate 104. First and second cholesteric liquid crystal (CLC) polarizing layers 114 and 116 are sequentially formed on an outer surface of the second substrate 104. A backlight unit 118 is disposed outside the second CLC polarizing layer 116.

The backlight unit 118 emits light of a spectrum that has peaks at wavelength bands corresponding to red, green and blue colors. The second CLC polarizing layer 116 has left-handed or right-handed helical pitch corresponding to a broadband of wavelength. The first CLC polarizing layer 114 does not have a continuous pitch but a discrete pitch of left-handedness or right-handedness to collect the light having wavelengths corresponding to red, green and blue colors. The pitch of the first CLC polarizing layer 114 is adjusted to correspond not to all wavelengths in a visible light range but to a wavelength in a specific light range. In addition, the first CLC polarizing layer 114 has a circular polarization direction opposite to the second CLC polarizing layer 116, while the CCF layer 106 has the same circular polarization direction as the first CLC polarizing layer 114.

Figure 5:
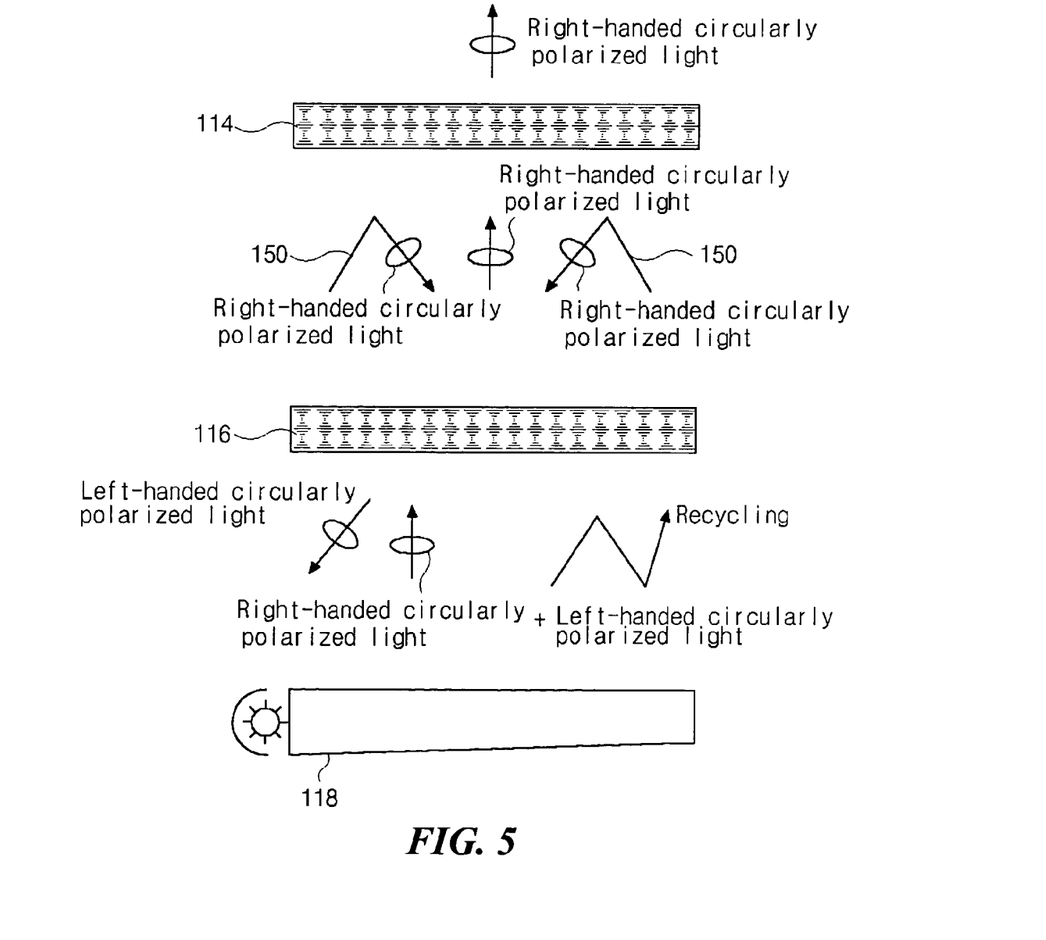
FIG. 5 is a schematic cross-sectional view illustrating polarization state of light passing through first and second cholesteric liquid crystal polarizing layers for a transmissive liquid crystal display device according to a first embodiment of the present invention.
Figure 6A:
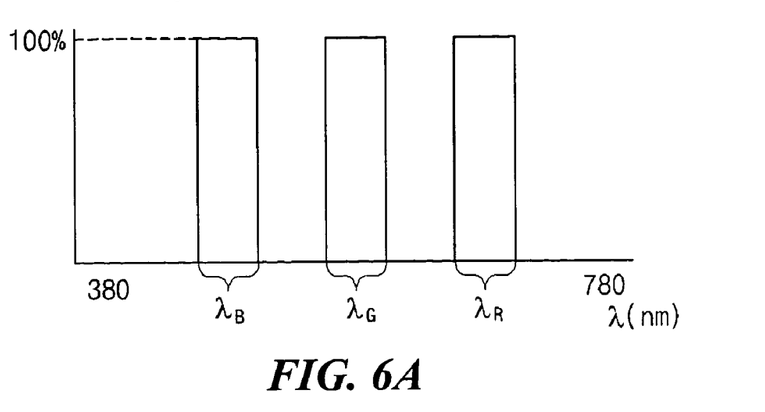
FIGS. 6A to 6C are spectrums of a backlight unit, a second cholesteric liquid crystal polarizing layer and a first cholesteric liquid crystal polarizing layer according to a first embodiment of the present invention, respectively.
Figure 6B:
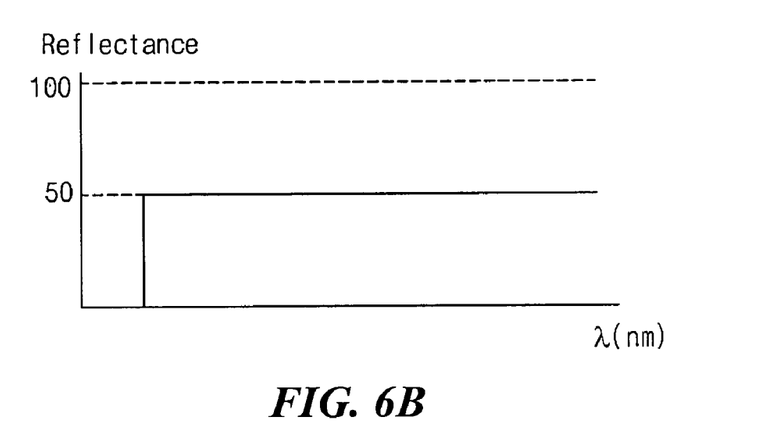
Figure 6C:
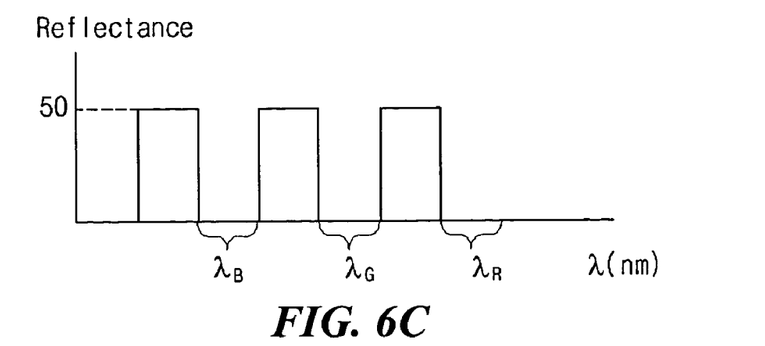

FIG. 5 is a schematic cross-sectional view illustrating polarization state of light passing through first and second cholesteric liquid crystal polarizing layers for a transmissive liquid crystal display device according to a first embodiment of the present invention, and FIGS. 6A to 6C are spectrums of a backlight unit, a second cholesteric liquid crystal polarizing layer and a first cholesteric liquid crystal polarizing layer according to a first embodiment of the present invention, respectively.

In FIGS. 5 and 6A, a backlight unit 118 emits light of a spectrum having peaks at first wavelength bands "$\lambda_R$," "$\lambda_G$" and "$\lambda_B$" corresponding to red, green and blue colors toward a second cholesteric liquid crystal (CLC) polarizing layer 116. Even though the light includes almost all wavelengths, dominant peaks of intensity are shown at specific wavelength bands "$\lambda_R$," "$\lambda_G$" and "$\lambda_B$."

In FIGS. 5 and 6B, the second CLC polarizing layer 116 has a left-handed helical pitch of a broadband wavelength. Since left-handed circularly polarized light reflects from the second CLC polarizing layer 116, about 50% of light emitted from the backlight unit 118 reflects from the second CLC polarizing layer 116. However, the left-handed circularly polarized light reflecting from the second CLC polarizing layer 116 is inverted into right-handed circularly polarized light through a recycling process between the backlight unit 118 and the second CLC polarizing layer 116, thereby passing through the second CLC polarizing layer 116.

In FIGS. 5 and 6C, a first CLC polarizing layer 114 over the second CLC polarizing layer 116 has a right-handed helical pitch of second wavelength bands except for wavelengths corresponding to the red, green and blue colors. Accordingly, a spectrum of the first CLC polarizing layer 114 has peaks at the second wavelength bands between the first wavelength bands "$\lambda_R$," "$\lambda_G$" and "$\lambda_B$" of FIG. 6A. For light obliquely incident to the first CLC polarizing layer 114, since light having a shorter wavelength reflects, light having the first wavelength bands "$\lambda_R$," "$\lambda_G$" and "$\lambda_B$" (of FIG. 6A) reflects from the first CLC polarizing layer 114. The reflected right-handed circularly polarized light having the first wavelength bands "$\lambda_R$," "$\lambda_G$" and "$\lambda_B$" (of FIG. 6A) passes through the first CLC polarizing layer 114 by the recycling process between the second CLC polarizing layer 116 and the backlight unit 118.

The light emitted from the backlight unit 118 and corresponding to red, green and blue colors is collected toward a front direction by using the first and second CLC polarizing layers 114 and 116. Therefore, high brightness is obtained. In FIG. 5, the first and second CLC polarizing layers 114 and 116 have right-handed and left-handed helical pitches, respectively. In another embodiment, the first and second CLC polarizing layers 114 and 116 can be formed to have left-handed and right-handed helical pitches, respectively. When the first and second CLC polarizing layers 114 and 116 have helical pitches of opposite direction, the light emitted from the backlight unit 118 can be collected.

Figure 7:
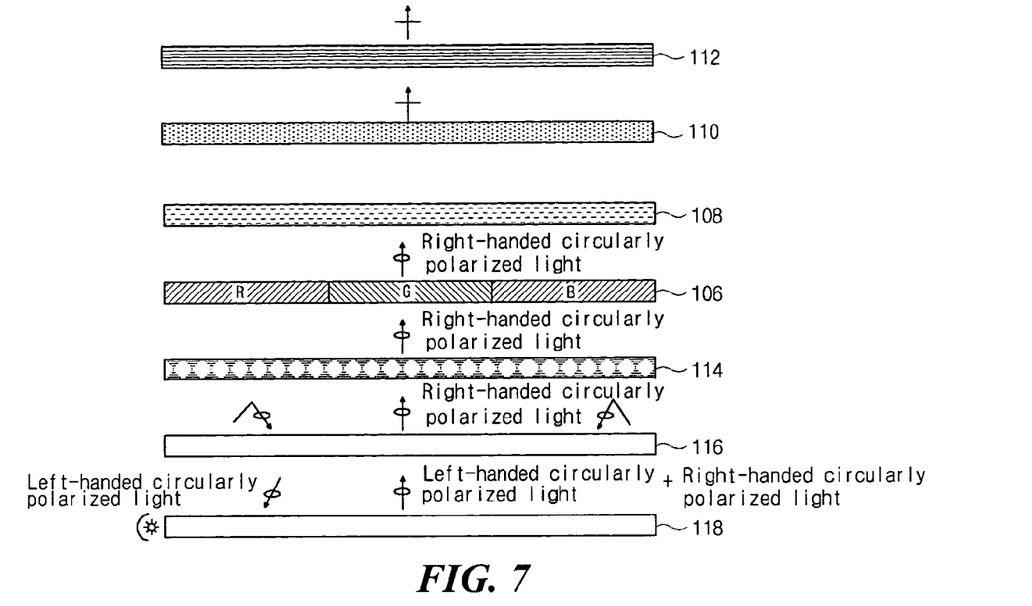
FIG. 7 is a schematic cross-sectional view illustrating polarization state of light passing through a transmissive liquid crystal display device according to a first embodiment of the present invention.

FIG. 7 is a schematic cross-sectional view illustrating polarization state of light passing through a transmissive liquid crystal display device according to a first embodiment of the present invention.

In FIG. 7, light of a spectrum having peaks at first wavelength bands corresponding to red, green and blue colors is emitted from a backlight unit 118 toward a second cholesteric liquid crystal (CLC) polarizing layer 116 having left-handed helical pitch of a broadband wavelength. Among the light emitted from the backlight unit 118, left-handed circularly polarized light reflects from the second CLC polarizing layer 116 and right-handed circularly polarized light passes through the second CLC polarizing layer 116. The reflected left-handed circularly polarized light is inverted into right-handed circularly polarized light through a recycling process between the backlight unit 118 and the second CLC polarizing layer 116, thereby passing through the second CLC polarizing layer 116. Since a first CLC polarizing layer 114 has a right-handed helical pitch of wavelength bands except for wavelengths corresponding to the red, green and blue colors, right-handed circularly polarized light having wavelengths corresponding to red, green and blue colors passes through the first CLC polarizing layer 114. In addition, for obliquely incident light, light having a shorter wavelength reflects from the first CLC polarizing layer. Accordingly, obliquely incident light having wavelengths corresponding to red, green and blue colors reflects from the first CLC polarizing layer 114. As a result, most of right-handed circularly polarized light having wavelengths corresponding to red, green and blue colors perpendicularly passes through the first CLC polarizing layer 114. The right-handed circularly polarized light passing through the first CLC polarizing layer 114 is inverted into linearly polarized light having a polarization direction parallel to an optical axis of a linear polarizing layer 112 while passing through a CCF layer 106 having the same circular polarization direction as the first CLC polarizing layer 114, a liquid crystal layer 108 and a retardation layer 110, thereby passing through the linear polarizing layer 112.

As illustrated in FIG. 7, most of light having wavelengths corresponding to red, green and blue colors is perpendicularly emitted by the first CLC polarizing layer 114 reflecting only right-handed circularly polarized light having specific wavelengths and the second CLC polarizing layer 116 only left-handed circularly polarized light having broadband of wavelength. Accordingly, little amount of light is obliquely emitted from the LCD panel and problems such as color inversion are prevented. However, as deviated from a center of the LCD panel, brightness decreases. To solve these problems, other embodiments are suggested.

Figure 8:
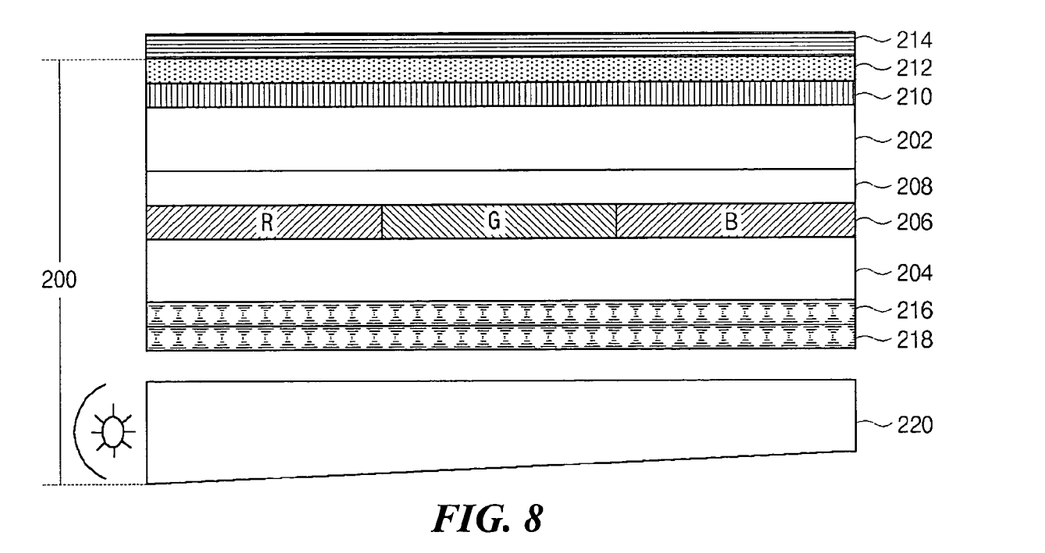
FIG. 8 is a schematic cross-sectional view of a transmissive liquid crystal display device according to a second embodiment of the present invention.

FIG. 8 is a schematic cross-sectional view of a transmissive liquid crystal display device according to a second embodiment of the present invention.

In FIG. 8, a transmissive liquid crystal display (LCD) device 200 includes first and second substrates 202 and 204 facing and spaced apart from each other. A diffusing layer 210, a retardation layer 212 such as quarter wave plate (QWP) and a linear polarizing layer 214 are sequentially formed on an outer surface of the first substrate 202. A cholesteric liquid crystal color filter (CCF) layer 206 is formed on an inner surface of the second substrate 204, and a liquid crystal layer 208 is formed between the first substrate 202 and the CCF layer 206. A first cholesteric liquid crystal (CLC) polarizing layer 216 having right-handed helical pitch and a second CLC polarizing layer 218 having left-handed helical pitch are sequentially formed on an outer surface of the second substrate 204. A backlight unit 220 is disposed outside the second CLC polarizing layer 218.

The first CLC polarizing layer 216 does not have a continuous pitch but a discrete pitch of right-handedness to collect light from the backlight unit 220 having wavelengths corresponding to red, green and blue colors, while the second CLC polarizing layer 218 has a continuous pitch corresponding to a broadband of wavelength. The pitch of the first CLC polarizing layer 216 is adjusted to correspond not to all wavelengths in a visible light range but to a wavelength in a specific range. In addition, the first CLC polarizing layer 216 has a circular polarization direction opposite to the second CLC polarizing layer 218, while the CCF layer 206 has the same circular polarization direction as the first CLC polarizing layer 216.

Since light perpendicularly passing through the second and first CLC polarizing layers 218 and 216 and the liquid crystal layer 208 is diffused through the diffusing layer 210, a wide viewing angle is obtained. A hologram diffuser or a conventional diffuser in a backlight unit can be used as the diffusing layer 210. Even though the diffusing layer 210 is formed on the outer surface of the first substrate 202 in FIG. 8, the diffusing layer 210 can be formed on an inner surface of the first substrate 202 in another embodiment. In particular, the diffusing layer 210 can be formed inside or outside the LCD panel according to characteristics of display quality.

Figure 9:
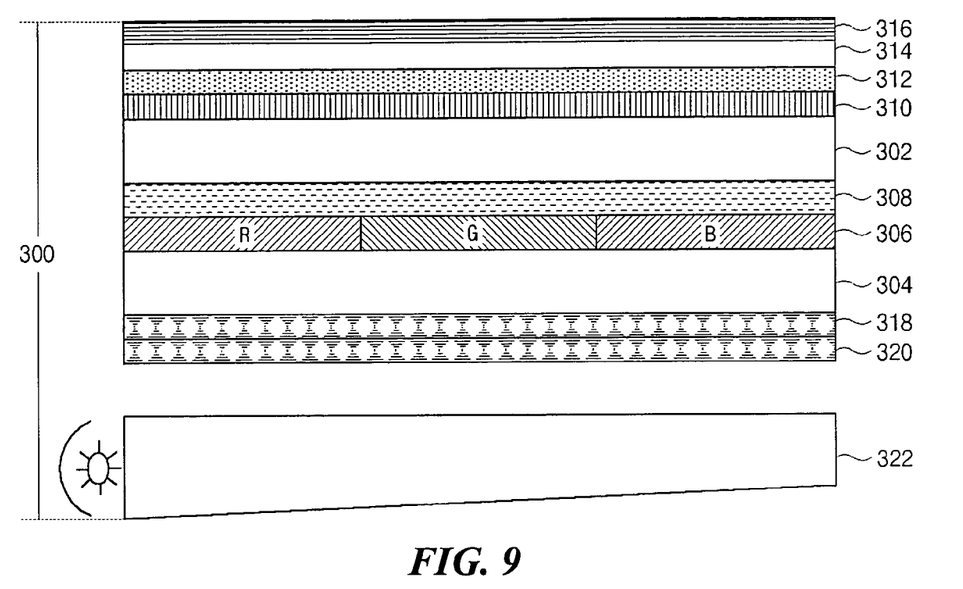
FIG. 9 is a schematic cross-sectional view of a transmissive liquid crystal display device according to a third embodiment of the present invention.

FIG. 9 is a schematic cross-sectional view of a transmissive liquid crystal display device according to a third embodiment of the present invention.

In FIG. 9, a transmissive liquid crystal display (LCD) device 300 includes first and second substrates 302 and 304 facing and spaced apart from each other. A diffusing layer 310, a retardation layer 312 such as quarter wave plate (QWP), a compensation layer 314 for viewing angle and a linear polarizing layer 316 are sequentially formed on an outer surface of the first substrate 302. A cholesteric liquid crystal color filter (CCF) layer 306 is formed on an inner surface of the second substrate 304, and a liquid crystal layer 308 is formed between the first substrate 302 and the CCF layer 306. A first cholesteric liquid crystal (CLC) polarizing layer 318 having right-handed helical pitch and a second CLC polarizing layer 320 having left-handed helical pitch are sequentially formed on an outer surface of the second substrate 304. A backlight unit 322 is disposed outside the second CLC polarizing layer 320.

The first CLC polarizing layer 318 does not have a continuous pitch but a discrete pitch of right-handedness to collect light from the backlight unit 322 having wavelengths corresponding to red, green and blue colors, while the second CLC polarizing layer 320 has a continuous pitch corresponding to a broadband of wavelength. The pitch of the first CLC polarizing layer 318 is adjusted to correspond not to all wavelengths in a visible light range but to a wavelength in a specific range. In addition, the first CLC polarizing layer 318 has a circular polarization direction opposite to the second CLC polarizing layer 320, while the CCF layer 306 has the same circular polarization direction as the first CLC polarizing layer 318.

When light perpendicularly passing through the second and first CLC polarizing layers 320 and 318 and the liquid crystal layer 308 is diffused along a direction oblique to a perpendicular direction through the diffusing layer 310, the diffused light has a different retardation value from light perpendicularly emitted from the diffusing layer 310. This difference for the oblique light causes reduction of contrast ratio in a side view. The compensation layer 314 compensates the retardation value difference through the retardation layer 312. Since a color difference between front and side is compensated, a viewing angle is wider.

Figure 10:
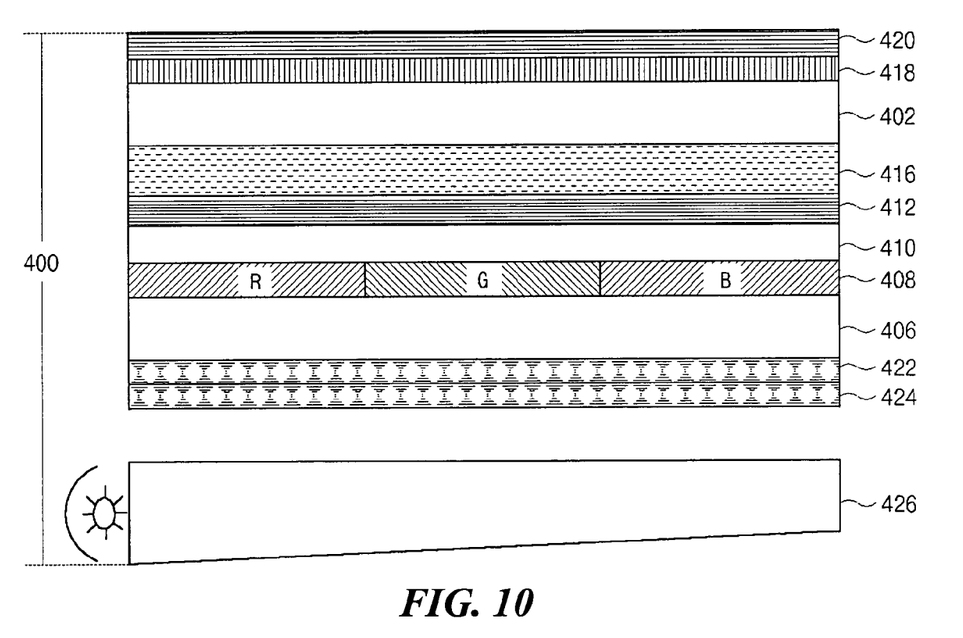
FIG. 10 is a schematic cross-sectional view of a transmissive liquid crystal device according to a fourth embodiment of the present invention.

FIG. 10 is a schematic cross-sectional view of a transmissive liquid crystal device according to a fourth embodiment of the present invention.

In FIG. 10, a transmissive liquid crystal display (LCD) device 400 includes first and second substrates 402 and 406 facing and spaced apart from each other. A diffusing layer 418, a first linear polarizing layer 420 are sequentially formed on an outer surface of the first substrate 402. A cholesteric liquid crystal color filter (CCF) layer 408, a retardation layer 410 such as quarter wave plate (QWP) and a second linear polarizing layer 412 are sequentially formed on an inner surface of the second substrate 404. A liquid crystal layer 416 is formed between the first substrate 402 and the second linear polarizing layer 412. A first cholesteric liquid crystal (CLC) polarizing layer 422 having right-handed helical pitch and a second CLC polarizing layer 424 having left-handed helical pitch are sequentially formed on an outer surface of the second substrate 406. A backlight unit 426 is disposed outside the second CLC polarizing layer 424.

Since the retardation layer 410 and the second linear polarizing layer 412 are formed between the liquid crystal layer 416 and the CCF layer 408, an additional compensation layer for viewing angle on the diffusing layer 418 is not necessary.

Figure 11:
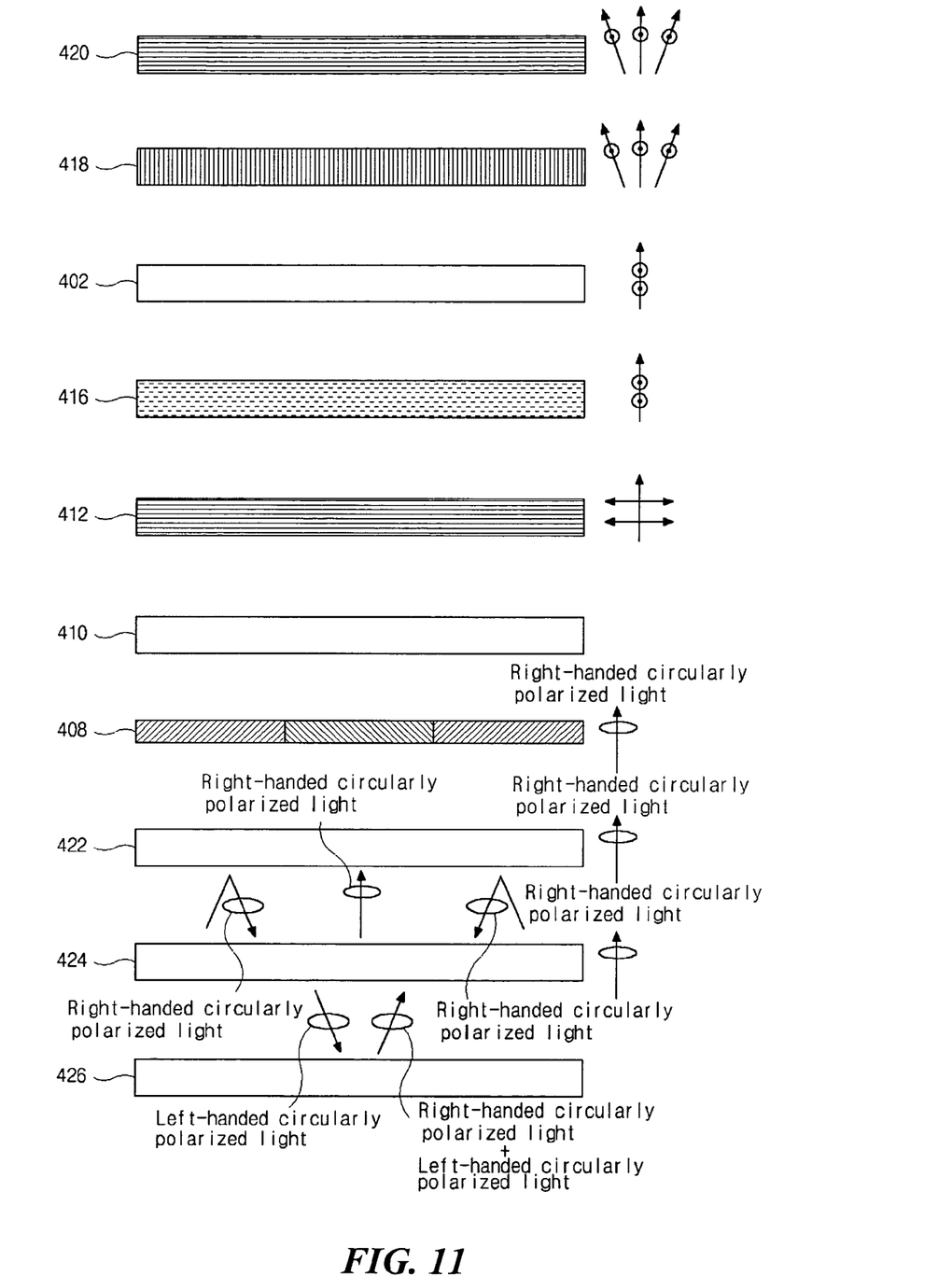
FIG. 11 is a schematic cross-sectional view illustrating polarization state of light passing through a transmissive liquid crystal display device according to a fourth embodiment of the present invention.

FIG. 11 is a schematic cross-sectional view illustrating polarization state of light passing through a transmissive liquid crystal display device according to a fourth embodiment of the present invention.

In FIG. 11, among light emitted from a backlight unit 426, only left-handed circularly polarized light reflects from a second CLC polarizing layer 424 and right-handed circularly polarized light passes through the second CLC polarizing layer 424. The reflected left-handed circularly polarized light is inverted into right-handed circularly polarized light through a recycling process between the backlight unit 426 and the second CLC polarizing layer 424, thereby passing through the second CLC polarizing layer 424.

When the right-handed circularly polarized light emitted from the second CLC polarizing layer 424 enters a first CLC polarizing layer 422, obliquely incident light corresponding to red, green and blue colors reflects from the first CLC polarizing layer 422. The reflected obliquely incident light is perpendicularly emitted toward the first CLC polarizing layer 422 through the recycling process. Accordingly, the right-handed circularly polarized light is perpendicularly emitted from the first CLC polarizing layer 422 and passes through a CCF layer 408. While passing through a retardation layer 410, the right-handed circularly polarized light is inverted into a linearly polarized light having a polarization direction parallel to an optical axis of a second linear polarizing layer 412. As a result, the linearly polarized light passes through the second linear polarizing layer 412 and is emitted through a liquid crystal layer 416, a diffusing layer 418 and a first linear polarizing layer 420. A compensation layer for viewing angle may be formed on the diffusing layer 418 in another embodiment.

Even though a transmissive LCD device has first and second CLC polarizing layers having discrete and continuous helical pitches, respectively, in the first to fourth embodiments of the present invention, the first and second CLC polarizing layers may be formed to have continuous and discrete helical pitches, respectively, in the other embodiments. Accordingly, a transmissive LCD device of the present invention has a structure such that one of the first and second CLC polarizing layers has a discrete helical pitch and the other of the first and second CLC polarizing layers has a continuous helical pitch. Moreover, a CCF layer may be formed to have the same circular polarization direction as a CLC polarizing layer having a discrete helical pitch.

In a transmissive LCD device according to the present invention, light is effectively collected by forming the first and second CLC polarizing layers between the backlight unit and the CCF layer. Moreover, high display quality is obtained by reducing color differences between front and oblique positions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing and spaced apart from each other;
   a retardation layer on an outer surface of the first substrate;
   a linear polarizing layer on the retardation layer;
   a cholesteric liquid crystal color filter (CCF) layer on an inner surface of the second substrate;
   a liquid crystal layer between the first substrate and the CCF layer;
   a first cholesteric liquid crystal (CLC) polarization layer on an outer surface of the second substrate and having a first helical pitch of a first circular polarization direction;
   a second cholesteric liquid crystal (CLC) polarization layer on the first CLC polarization layer, the second CLC polarization layer having a second helical pitch of a second circular polarization direction opposite to the first circular polarization direction, wherein the CCF layer has the same circular polarization direction as the first circular polarization direction; and
   a backlight unit outside the second CLC polarization layer.

2. The device according to claim 1, wherein the first helical pitch is discrete and the second helical pitch is continuous.

3. The device according to claim 2, wherein the first helical pitch corresponds to bands of wavelengths adjacent to red, green and blue colors, and the second helical pitch corresponds to a broadband of wavelength.

4. The device according to claim 3, the CCF layer has a third helical pitch of a third circular polarization direction the same as the first circular polarization direction.

5. The device according to claim 3, the third helical pitch corresponds to bands of wavelengths of red, green and blue colors.

6. The device according to claim 3, the first to third circular polarization direction is one of right-handedness and left-handedness.

7. The device according to claim 1, wherein the first helical pitch is continuous and the second helical pitch is discrete.

8. The device according to claim 1, further comprising a diffusing layer between the first substrate and the retardation layer.

9. The device according to claim 8, further comprising a compensation layer of viewing angle between the retardation layer and the linear polarizing layer.

10. The device according to claim 1, wherein the backlight unit emits light of a spectrum having peaks at wavelength bands corresponding to red, green and blue colors.

11. The device according to claim 1, wherein the retardation layer is a quarter wave plate.

* * * * *